United States Patent
Wolfson et al.

(10) Patent No.: US 10,089,855 B2
(45) Date of Patent: Oct. 2, 2018

(54) SYSTEM AND METHOD FOR PROCESSING EMERGENCY ALERTS AND RESPONSES

(71) Applicant: Warnable, LLC, New York, NY (US)

(72) Inventors: Adam Wolfson, New York, NY (US); Wesley Lau, Long Island City, NY (US)

(73) Assignee: Warnable, LLC, New York, NY (US)

( * ) Notice: Subject to any disclaimer, the term of this patent is extended or adjusted under 35 U.S.C. 154(b) by 161 days.

(21) Appl. No.: 15/235,995

(22) Filed: Aug. 12, 2016

(65) Prior Publication Data

US 2017/0148306 A1    May 25, 2017

Related U.S. Application Data

(60) Provisional application No. 62/258,848, filed on Nov. 23, 2015.

(51) Int. Cl.

| | |
|---|---|
| *G08B 25/01* | (2006.01) |
| *H04W 4/021* | (2018.01) |
| *H04W 4/04* | (2009.01) |
| *H04W 4/02* | (2018.01) |

(52) U.S. Cl.
CPC ......... *G08B 25/016* (2013.01); *G08B 25/014* (2013.01); *H04W 4/02* (2013.01); *H04W 4/021* (2013.01); *H04W 4/043* (2013.01)

(58) Field of Classification Search
CPC ..... G08B 25/016; G08B 25/014; H04W 4/02; H04W 4/021; H04Q 4/043
See application file for complete search history.

(56) References Cited

U.S. PATENT DOCUMENTS

| | | | |
|---|---|---|---|
| 6,084,510 A | * | 7/2000 | Lemelson ............ G08B 15/004 340/539.13 |
| 7,026,925 B2 | | 4/2006 | Roche et al. |
| 8,769,023 B2 | | 7/2014 | Lau |
| 9,014,660 B2 | | 4/2015 | Pahlevani |
| 9,014,661 B2 | | 4/2015 | deCharms |

(Continued)

FOREIGN PATENT DOCUMENTS

| | | |
|---|---|---|
| JP | 2012105129 A | 5/2012 |
| WO | WO-2015057187 A1 | 4/2015 |

*Primary Examiner* — Curtis Odom
(74) *Attorney, Agent, or Firm* — Goodwin Procter LLP

(57) ABSTRACT

An emergency alert system that facilitates communication with groups and/or individuals (e.g., residents, tenants, inmates, passengers, students, teachers, employees, public officials, service members, hospitality guests, patients, and event spectators) in a pre-definable area such as a geographic area, a contained structure, and a geo-fence area via each individual's mobile communication device while in communication with a communication network, the system including a non-transitory, machine-readable medium storing information that includes machine-readable, processor-executable instructions and a data processor that executes the instructions stored in the non-transitory, machine-readable medium. In some implementations, the data processor is adapted to account for each individual within the pre-definable area during a period of time, identify any individual not within the pre-definable area during the period of time, and aggregate and compile individual location and accountability data.

23 Claims, 5 Drawing Sheets

(56) References Cited

U.S. PATENT DOCUMENTS

| | | |
|---|---|---|
| 2008/0139165 A1 | 6/2008 | Gage et al. |
| 2013/0218959 A1 | 8/2013 | Sa et al. |
| 2014/0035726 A1* | 2/2014 | Schoner ............ G06K 7/10366 340/8.1 |
| 2014/0364081 A1 | 12/2014 | Rauner |

* cited by examiner

FIG. 3

Customizable Templates

| Choices | Decisions | Example |
|---|---|---|
| Template Name | Manual text input | Fire Alarm |
| Response Protocol Assigned | Multiple choice of pre-defined protocol | Evacuate |
| Allow Sharing of Sender Location? | Yes or No | Yes |
| Audience Choice | Multiple choice of pre-defined audiences | Administrators Only |
| Allow Sharing of User Identity? | Yes or No | Yes |
| Allow Photos/Videos? | Yes or No | Yes |
| Allow Chat | Yes or No | Yes |
| Allow Users to Check In? | Yes or No | Yes |
| Allow Users to Designate that they have called the authorities? | Yes or No | Yes |

SYSTEM AND METHOD FOR PROCESSING EMERGENCY ALERTS AND RESPONSES

CROSS-REFERENCE TO RELATED APPLICATION

This application is a non-provisional patent application claiming priority of U.S. Provisional Patent Application No. 62/258,848, filed Nov. 23, 2015, which is incorporated by reference herein in its entirety.

BACKGROUND OF THE INVENTION

Field of the Invention

The present invention relates generally to systems and methods for delivering customized communication alerts, and, more specifically, to techniques and supporting systems for configuring an emergency alert protocol and system for use among a population having individual mobile communication devices.

BACKGROUND OF THE INVENTION

The unpredictable nature and emotional distress resulting from natural and/or man-made emergencies make delivery and management of emergency responses a priority in order to identify individuals that may or may not be at risk, account for members of those impacted by the emergency, and communicate status to all effected. The emergency response data and classification of members of the audience into groups (each potentially with its own protocol) may then be selectively shared with law enforcement, parents, guardians, media, and so forth to inform third parties of any possible danger or likelihood of a threat to a particular group and/or member of the audience.

SUMMARY OF THE INVENTION

In a first aspect, an emergency alert system facilitates communication with groups and/or individuals (e.g., residents, tenants, inmates, passengers, students, teachers, employees, public officials, service members, hospitality guests, patients, and event spectators) in a pre-definable area such as a geographic area, a contained structure, and a geo-fence area via each individual's mobile communication device while in communication with a communication network, including without limitation an Internet connection, a mobile service network, and the like. In some embodiments, the system includes a non-transitory, machine-readable medium storing information that includes machine-readable, processor-executable instructions and a data processor(s) that executes the instructions stored in the non-transitory, machine-readable medium. In some implementations, data processor is adapted to account for each individual within the pre-definable area during a period of time, identify any individual not within the pre-definable area during the period of time, and aggregate and compile individual location and accountability data. In a further embodiment, the data processor(s) is further adapted to notify each identified individual within the pre-definable area of an existing condition, e.g., an emergency alert, forward instructions, messages and other pertinent information.

In one implementation, accounting for each individual further includes determining a geographical location of the individual during the period of time, as well as comparing where each individual is located during the period of time with an expected location during the period of time. For example, the expected location can be a preset geographic location that is within the overall location, e.g., a room, a floor, and so forth. In some variations accounting for each individual further includes time-stamping each individual's location.

In another implementation, identifying any individual not within the pre-definable area may include determining a geographical location of the individual during the period of time and/or accounting for each individual and identifying any individual includes determining a first class of individuals located within a geo-fence area and a second class of individuals located outside of the geo-fence area.

In some implementations, the system further includes customized templates which are used to generate and transmit communication alert signals, and for aggregation and management of communication responses sent to and/or received from the individuals. These templates may include variables that can be further modified to alter the ability of the sender of the alerts to utilize certain functions such as sharing of their exact location, media sharing (e.g., images and videos) relating to the alert, and submitting the alert anonymously. For example, in some variations, the system generates and transmits the communication alert signals to individuals, receives response signals to the communication alert from individuals (either individually or as a group), uses data contained in the response signals to identify each responding individual, uses data contained in the response signals to identify a geographic location of each individual, compares the geographic location of each individual to the pre-defined area, and, for comparisons in which the geographic location of an individual located within a pre-defined area, store the identity and geographic location of the individual in a first database, otherwise for any comparison in which the geographic location of an individual not located within the pre-defined area, store the identity and geographic location of the individual in a second database. Other information identified may depend solely on variables embedded within that particular alert template.

In a second aspect, the invention provides a method of alerting individuals (residents, tenants, inmates, passengers, students, teachers, employees, public officials, service members, hospitality guests, event spectators, etc.), in a pre-definable area such as a geographic area, a contained structure, and a geo-fence area, of an existing, expected and/or occurring condition. In one embodiment, the method includes providing a non-transitory, machine-readable medium storing information that includes machine-readable, processor-executable instructions and a data processor(s). The data processor(s) account for individuals within the pre-defined area during a period of time and identify individuals not within the pre-defined area during the period of time and aggregating and compiling individual location data related to the individual(s). In a further embodiment, the method includes notifying individuals within the pre-definable area of an existing condition and/or a response plan related to the nature of the alert, e.g., an emergency alert and the response steps associated with the emergency condition.

In one implementation, accounting for each individual further includes determining a geographical location of the individual during the period of time. In a further variation, accounting for each individual includes comparing where each individual is located during the period of time with where each individual is supposed to be located during the period of time. In another variation, accounting for each individual further comprises time-stamping each individual's location.

In another implementation, identifying individual(s) not within the pre-definable area includes determining a geographical location of individual(s) during the period of time. Accounting for each individual and identifying individual(s) may also include determining a first group of individuals located within a geo-fence area and a second group of individuals located outside of the geo-fence area.

In some implementations, the methods further include the creation, modification and use of customized templates to design and implement the processes and forms that generate and transmit communication alert signals, and to aggregate and manage communication responses received from one or more of the individuals. For example, in some variations, the method further includes: generating and transmitting the communication alert signals to the individuals; receiving response signals to the communication alert from some portion of the individuals; using data contained in the response signals to identify each responding individual if they choose to be identified; using data contained in the response signals to identify a geographic location of each responding individual; comparing the geographic location of each responding individual to the pre-defined area; using data contained in the response signals to identify other pre-determined variables such as each responding individual's preference to communicate with the receiver of the signals or include media (such as images and videos) related to that signal alert; and, for any comparison in which the geographic location of a corresponding individual is located within the pre-defined area, storing the identity and geographic location of the corresponding individual in a first database, otherwise for any comparison in which the geographic location of a corresponding individual is not located within the pre-defined area, storing the identity and geographic location of the corresponding individual in a second database.

BRIEF DESCRIPTION OF THE DRAWINGS

Further features, embodiments, and advantages of the present invention will become apparent from the following detailed description with reference to the drawings, wherein:

FIG. 3 is a table providing a variety of illustrative template features that correspond to an illustrative embodiment of the choices that a sender of an emergency alert is able to utilize when initially sending out an emergency alert.

DETAILED DESCRIPTION

Figure 1:
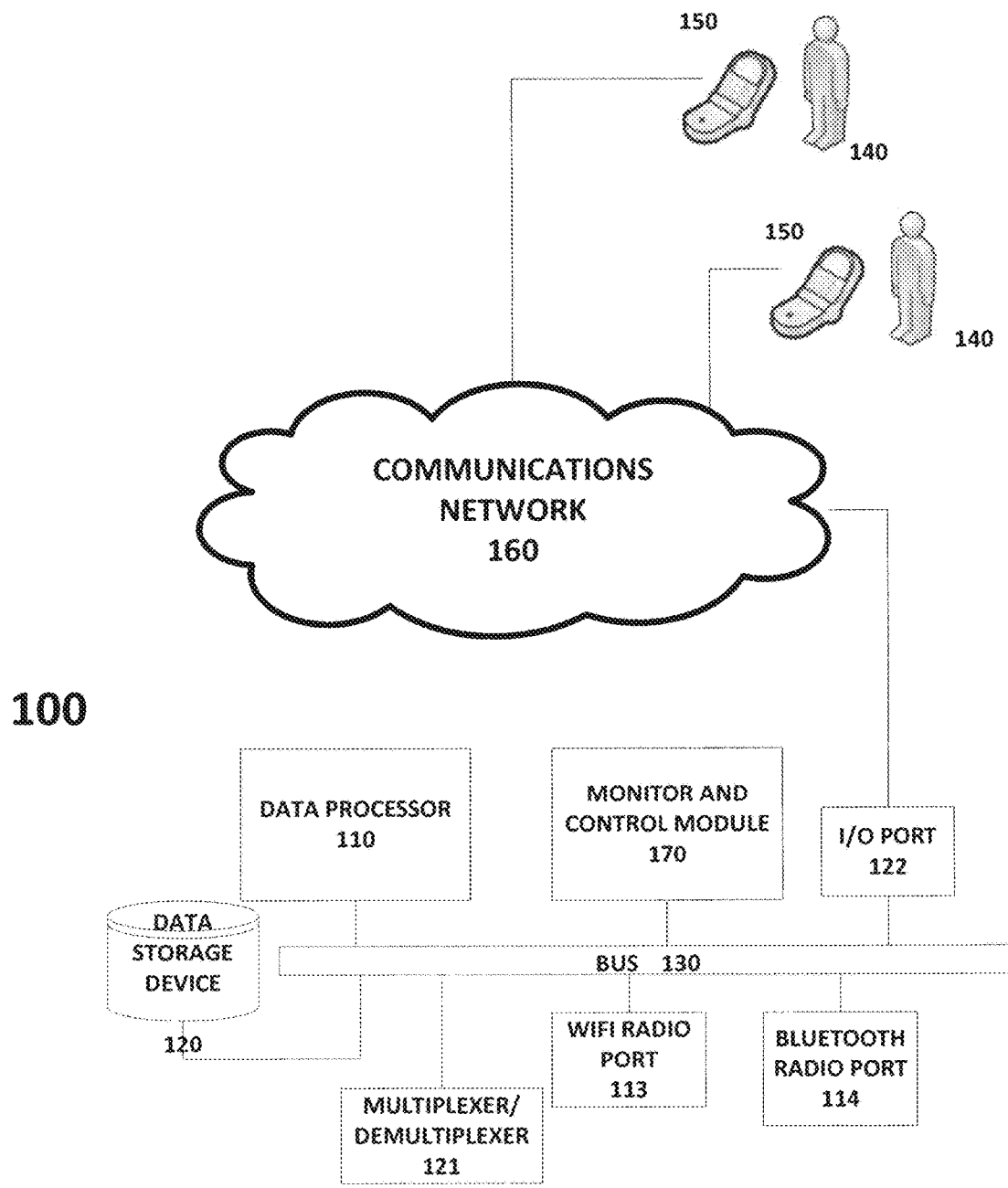
FIG. 1 is a block diagram providing an illustrative embodiment of a system for processing and managing emergency alerts and responses in accordance with one or more embodiments of the present invention.

As a preliminary matter, it will readily be understood by one having ordinary skill in the relevant art that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate one or more of the above-disclosed aspects of the invention and may further incorporate one or more of the above-disclosed features. Moreover, many embodiments, such as adaptations, variations, modifications, and equivalent arrangements, will be implicitly disclosed by the embodiments described herein and fall within the scope of the present invention. Accordingly, although the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which is defined by the claims and the equivalents thereof.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

Additionally, it is important to note that each term used herein refers to that which those skilled in the art would understand such term to mean based on the contextual use of such term herein. To the extent that the meaning of a term used herein differs in any way from any particular dictionary definition of such term, it is intended that the meaning of the term as understood by those skilled in the art should prevail.

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

FIG. 1 shows an exemplary architecture for a system 100 for customizing communication alerts such as emergency alerts to individuals or groups of individuals 140 located within a predetermined area or associated with a predetermined group. In most cases, each individual 140 has access to a mobile communication device 150. The system 100 includes at least one data processing device, or data processor(s) 110, and at least one data storage device 120. In some implementations, the data processor(s) 110 and the data storage device(s) 120 may be coupled by an interconnection element such as a bus 130. The bus 130 enables communications, e.g., the transfer of data and instructions, to be exchanged internally between module components and externally between system components. Thus, the bus 130 may include one or more physical busses, for coupling between system 100 elements, e.g., specialized or standard computing bus technologies such as IDE, SCSI, PCI, and InfiniBand.

The data processor(s) 110 and the data storage device(s) 120 are adapted to communicate with the individuals 140 via the mobile communication device 150 and at least one communications network 160. The mobile communication device 150 may include any device that can communicate using radio-enabled technology such as, but not limited to low power and standard Bluetooth, SMS messaging, RFID, Zigbee, Z-Wave, WiFi, NFC, cellular (e.g., 4G LTE) and any combination(s) thereof. Moreover, for the purpose of illustration and not limitation, the communication device 150 may be a smartphone, a tablet computer, a personal digital assistant, a smart watch, a wearable device such as a FitBit or similar device, a laptop computer, a notebook computer, a cellular telephone, and the like.

The communication network 160 may include any communication network through which system components may exchange data, e.g., the World, Wide Web, the Internet, an intranet, a wide area network (WAN), a local area network (LAN), cellular network, virtual private network, and so forth. To exchange data via the communications network 160, the data processor(s) 110 and data storage device(s) 120, as well as the network 160 itself, may use various methods, protocols, and standards, including, inter alfa, token ring, Ethernet, TCP/IP, UDP, HTTP, FTP, and SNMP.

The data processor(s) 110 may be a stand-alone apparatus or may consist of a combination of physical components that are connected and in communication with one another, e.g., via hardwire, cloud-based services, or wireless radio. Indeed, aspects in accordance with the present invention may be located on a single processing system or may be distributed among a plurality of systems connected via one or more communications networks 160. The data processor(s) 110 may include a commercially-available processor such as an Intel Core, Motorola PowerPC, MIPS, UltraSPARC, or Hewlett-Packard PA-RISC processor, but also may be any type of processor or controller as many other processors, microprocessors, and controllers are available. There are many examples of processors 110 currently in use including network appliances, personal computers, workstations, mainframes, networked clients, servers, media servers, application servers, database servers, and web servers. Other examples of processors 110 may include mobile devices, such as cellphones, personal digital assistants, and other devices having processors, and network equipment, such as load balancers, routers, and switches.

The data processor(s) 110 may include an operating system that manages at least a portion of the hardware and/or software elements included therein. Usually, a processing device 110 executes an operating system which may be, for example: a Windows-based operating system (e.g., Windows 7, Windows 2000 (Windows ME), Windows XP operating systems, and the like, available from the Microsoft Corporation), a MAC OS System X operating system available from Apple Computer, a Linux-based operating system distributions (e.g., the Enterprise Linux operating system, available from Red Hat Inc.), or a UNIX operating system available from various sources. Many other operating systems may be used, and embodiments are not limited to any particular implementation. Operating systems conventionally may be stored in memory.

The data processor(s) 110 and operating system together define a processing platform for which application programs in high-level programming languages may be written. These component applications may include executable, intermediate (for example, C−) or interpreted code that communicate over one or more communications networks 160 (e.g., the Internet) using a communication protocol (e.g., TCP/IP). Similarly, aspects in accordance with the present invention may be implemented using an object-oriented programming language, such as SmallTalk, Java, Javascript, SWIFT, C++, Ada, or C# (C-Sharp). Other object-oriented programming languages may also be used. Alternatively, functional, scripting, or logical programming languages may be used. For instance, aspects of the system may be implemented using an existing commercial product, such as, for example, Database Management Systems (e.g., SQL Server available from Microsoft of Seattle, Wash. and Oracle Database from Oracle of Redwood Shores, Calif.) or integration software (e.g., Web Sphere middleware from IBM of Armonk, N.Y.). However, a computer system running, for example, SQL Server may be able to support both aspects in accordance with the present invention and databases for sundry applications not within the scope of the invention.

In one or more of the embodiments of the present invention, the data processor(s) 110 is adapted to execute at least one application, algorithm, driver program, and the like, that results in acquiring and manipulating data. By executing the application, the processor(s) 110 receive, store, transmit and perform operations on data Memory may be used for storing programs and data during operation of the system 100. Memory may include multiple components or elements of a data storage device 120 or, in the alternate, can be a stand-alone device. More particularly, memory may include volatile storage, e.g., random access memory (RAM), and/or non-volatile storage, e.g., a read-only memory (ROM). The former may be a relatively high performance, volatile memory such as a dynamic random access memory (DRAM) or static ("cache") memory (SRAM). Various embodiments in accordance with the present invention may organize memory into particularized and, in some cases, unique structures to perform the aspects and functions disclosed herein.

In certain configurations, the data processor(s) 110 may include a monitor and control module 170 having one or more input and output (I/O) interfaces that may include, but is not limited to, buttons, switches, membranes, keyboards, displays, cameras, touchscreens, status lights, microphones, speakers, and the like, to enable individuals to interact with the monitor and control module 170 directly. In certain configurations, the data processor(s) 110 may also control an integrated display and user interface. Furthermore, the monitor and control module 170 may also include various communication ports. For example, a WiFi radio port 113, a Bluetooth radio port 114, and an analog or digital I/O port 122, for internal and external communication may be provided. Those of ordinary skill in the art will understand that the teachings of this application can be applied to other radio-enabled technologies including, but not limited to, Bluetooth, Zigbee, Z-Wave, RFID, WiFi, and NFC. Accordingly, in some implementations, additional modules may be added to the monitor and control module 170 including, but not limited to, a cellular modem, a Zigbee radio, a Z-Wave Radio, a RFID, a NFC, a USB port, and so forth. One or more of these modules may be combined into a single module.

In some implementations, the WiFi radio port 113 and/or Bluetooth radio port 114 may be used to transmit to and receive signals from mobile communication devices 150. For example, in operation, a transmission through the Bluetooth radio port 114, e.g., an emergency alert, may be used to locate Bluetooth components that are located within a pre-determined area and, moreover, to identify them, e.g., by their unique MAC address, cellphone number, and the like, and to determine their location. As will be discussed in greater detail below, receipt of a radio signal from the system 100 by the mobile communication devices 150 may be used to trigger certain events or actions that will be described in greater detail below. In some implementations, an analog or digital input/output port 122 may be used externally to communicate with other processing devices 110 or memory 120, e.g., via the communications network 160. For external communication, a wired or wireless network adapter may be required. Furthermore, in some implementations, a digital signal processing multiplexer/demultiplexer 121 may be in communication with or integrated into the data processor(s) 110, to receive data signals or provide control outputs.

In some embodiments, the monitor and control module 170 may be configured to receive data signals, e.g., wireless, radio signals, to detect the presence and/or the approximate location of mobile radio-enabled devices 150. Although this application may refer to smartphones and Bluetooth dongles, the teachings of the application can be applied to any radio-enabled component including, but not limited to, tablets computers, smart watches, activity monitors, laptop computers, cellular telephones, personal digital assistants, and the like.

In some implementations, an emergency alarm feature may be included with the system. For example, in one application, the emergency alarm feature may work in a similar manner to emergency alarm systems typically located in banks and savings and loans or panic system. In the case of the present system, however, in addition to sounding an audible alarm signal, the emergency alarm feature will initiate execution of the methods described in detail below, i.e., the broadcast alert.

Figure 2A:
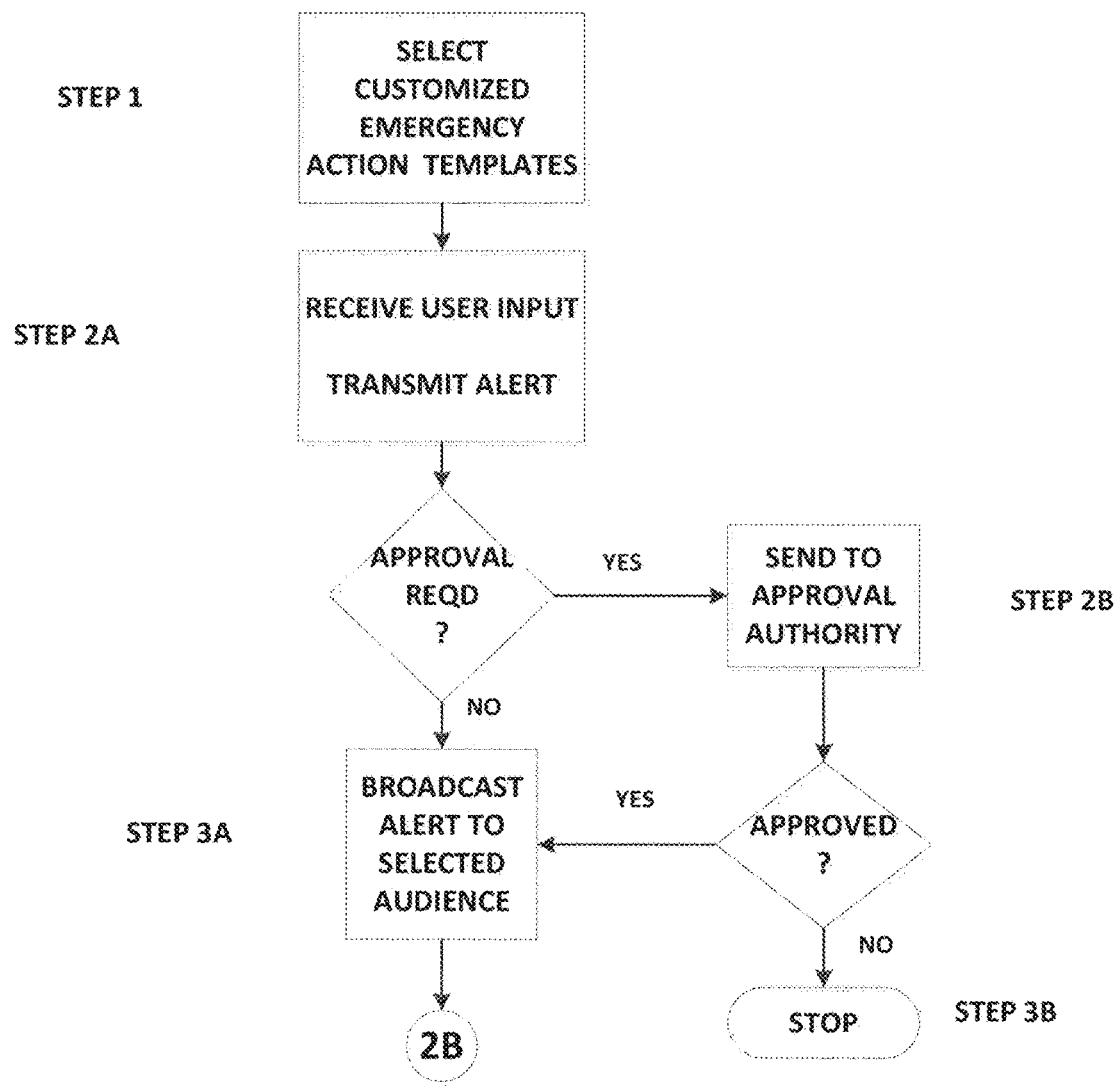
FIGS. 2A and 2B are flowcharts illustrating an exemplary method for processing and managing emergency alerts and responses in accordance with one or more embodiments of the present invention.
Figure 2B:
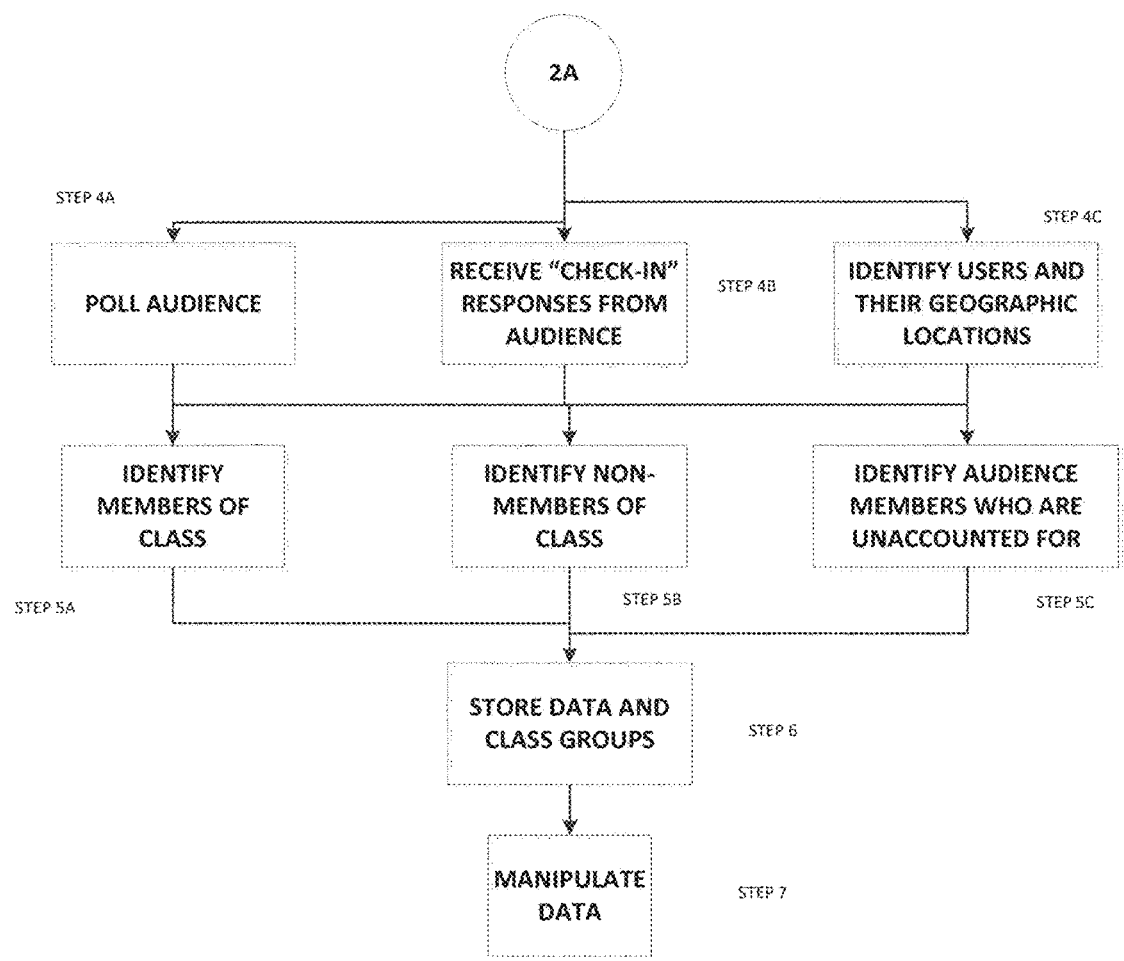

Referring to FIGS. 2A and 2B, a flow diagram illustrates a method for communicating emergency alerts and for managing response(s) to an emergency event. Although, the example used to describe the method involves a school building and school grounds as the contained structure and the geographic area, respectively, and the audience may include school employees, e.g., teachers, administration personnel, security personnel, custodial personnel, and the like, as well as students, the invention is not to be construed as being limited to this use. The school emergency scenario described herein is merely one of a myriad of scenarios for which procedural and communication templates for an emergency alert and response may be prepared in advance. Indeed, the capabilities and applicability of the described illustrative example of the invention in other scenarios would be apparent to those of ordinary skill in the art.

Prior to monitoring a pre-determined location at the beginning of an emergency event, the metes and bounds, as well as the contained structure(s) making up the pre-determined location and/or group association may be identified. In some embodiments, the contained structure(s) portion of the pre-determined location may include digitized plans and layouts for each floor of the contained structure(s), while the geographic area may be defined by an artificially-generated geo-fence. For example, the geo-fence may include the physical boundaries of the school grounds, a pre-determined distance (e.g., 500 yards) from the exterior walls of the contained structure, a pre-determined distance (e.g., 100 yards) from the boundary of the school grounds, a pre-defined radius (e.g., 1000 yards) from a center point, an enclosed area manually drawn on a map, and/or a pre-defined GPS mapping of an area. The distances provided parenthetically are used for illustrative purposes only and should not be construed as limiting the invention.

Advantageously, pre-determined locations for any number of discrete emergency events—as well as the emergency alert and response protocols for the same—may be designed as a customized template that is uploaded into the system. The template may then be used or otherwise selected upon the occurrence of the corresponding emergency alert. For example, if the emergency event involves an earthquake, an exemplary customized emergency alert/response template may seek knowledge of the audience located within the confined structure(s), i.e., the school building(s), as well as those located outside of the confined structure(s) but still within the geo-fenced area, whereas, if the emergency involves a student brandishing a knife on the third floor of the school building, an exemplary customized emergency alert/response template may only seek to learn the school audience located on the third floor at the time of the emergency, as well as the other factors relating to the emergency alert. An illustrative embodiment of content for a customizable template is shown in FIG. 3. The "choices" describe illustrative, non-limiting examples of the selective inputs for a "fire alarm" scenario. The pre-defined protocol assigned to this "fire alarm" emergency event is to evacuate the school building. In this exemplary template, sender location information and check-in may be shared; the recipient of all information is restricted to "administrators only;" the identity of a user(s) may be shared; the transmission of images and videos is permitted; chatting, e.g., between the members of the class, is permitted; periodic user check-in is permitted; and users are allowed to designate that they have/have not notified one or more authorities. Those of ordinary skill in the art can appreciate that the "choices" listed in FIG. 3 are merely illustrative and are not to be construed as limiting the invention in any way.

Broadcasting an emergency alert serves a number of purposes. Internally, once an alert is initiated, the processor and/or an algorithm software, driver program, or the like is adapted to initiate a log or journal in which all data related to the emergency event and response thereto may be recorded and stored for future use and reference. For example, once an emergency alarm feature has been activated, data such as the date and time of the alert, the nature of the emergency event, including a corresponding template used for the alert, the date and time of the broadcast, the geographical (e.g., GPS) location of the event, and so forth may be recorded and stored in memory. The alert and broadcast may be used, e.g., by school, law enforcement, security, and other personnel, to initiate or to trigger a lockdown response, subject, in some implementations, to approval by designated administrative personnel, e.g., the chief of police, the superintendent of the school or school district, and so forth. The events and activities undertaken during lockdown response may be defined in a pre-determined template.

Advantageously, after broadcast of the alert, "check-in" and sender location information may be used by school administrators to compare responding users who have checked-in to a roster of students who are supposed to be in specific portion of the school building, e.g., a class room, at the time of occurrence of the emergency event, e.g., a fire in the west wing of the first floor, to account for each responding student. Discrete sender location information as well as the location of the emergency event may also be shared with responding users, with which responding users may gauge their proximity to the danger. Allowing the transmission of photos and videos may provide instantaneous visuals of the conditions in certain portions of the school building. For example, photos or videos may show the density of smoke or presence of flames or sparks, to maintain real-time understand of the emergency event. Allowing chatting enables responding users to learn of the status of friends, family, and others. For example, user 1 may text to user 2: "R U OK?" to which user 2 may respond: "K." Finally, users may access and follow the response protocol to gain an understanding of what has been done' what is being done, and what needs to be done, according to the protocol.

Referring again to FIG. 2A, once a pre-determined location has been defined and has been linked to a corresponding emergency event, the system enables the creation and customization of any number of emergency scenario templates, i.e., alert and response, for members of a class (STEP 1) selected from the audience and likely to be affected by the nature of the emergency.

Creation and customization of templates enable the system and any system administrators to tailor emergency alerts/responses compatible with the nature of the emergency, the level of danger, the potential members of the class involved and at risk, as well as other factors relating to that emergency alert, including but not limited to: the sender's location, the sender's identity, the sender's ability to include media (e.g., images and video) related to that alert, the response protocols related to that alert, the process of approvals, and the audience(s) that will receive the alert. A non-exclusive list of customization parameters may include identifying the audience (i.e., the members of the class(es)), identifying non-members of the audience, identifying the extent of the pre-determined area, identifying the location of each members of the audience, identifying the location of the threat or nature of the emergency, request for and receipt of "check-ins" from members of the audience, and so forth. Additional parameters may also enable the system to receive from members of the audience and/or to re-transmit messages and information to third-parties, e.g., police, media, family members, emergency crews, school administrators, and so forth. The information may include video and/or photographic imaging data, text, social network, or other messages; a chat functionality; and the like. Advantageously, to protect the confidentiality and identity of the source of these data, the data may be received and/or re-transmitted in accordance with pre-established privacy settings, which may include a default privacy setting for all members of the class and all data, or, in the alternate, may include individual privacy settings for any member of the class and/or the parents/legal guardians of the member of the class desiring the same, and alternate settings for certain types of data.

Upon initiation or commencement of an emergency event, in accordance with any customized template created in advance to address the nature of the emergency event, in some embodiments, the user inputs the information required by the template and transmits an alert (STEP 2A). If there is no approval necessary for transmitting the alert, then the alert is broadcasted to the desired audience (STEP 3A). In some instances, however, transmission of the alert requires prior approval from a designated approving authority, in which case the designated approving authority verifies its authenticity (STEP 2B) before it is broadcast (STEP 3A). If the designated approving authority cannot verify the authenticity of the alert (STEP 2B), then the alert is deleted and not broadcast (STEP 3B).

Referring to FIG. 2B, the system may poll the audience (STEP 4A) in order to define the audience by pulling data from the data storage device(s), as well as to locate of each member of the audience (STEP 4C). For example, in some embodiments, the system or a system individual may initiate polling (STEP 4A) by generating and transmitting a universal emergency alert "check-in" message to the mobile communication devices of the audience. Low-cost mobile communication devices, e.g., dongles and the like, may be provided to, so as to be associated with, members of the audience who do not own their own mobile communication device. Transmission emergency alert messaging means, e.g., a push notification (which may vary based on the mobile communication device and network the device is on), a text message, a tweet, an email, an in-app chat, an SMS message, and the like, may be transmitted via radio and non-radio communications networks, e.g., WiFi, Zigbee, Z-Wave, NFC, RFID, low power or standard Bluetooth technology, and so forth.

Preferably, after receipt of the "check-in" message, a response to the "check-in" message may be automatically generated by an application uploaded onto each of the mobile devices and transmitted back to and received by the signal-originating transponder of system (STEP 4B). Alternatively, polled mobile communication device individuals may respond manually to "check-in" message for themselves or others, or use a geographical location to check-in automatically by GPS location within Geo-fence parameters. Advantageously, the received response to the polling may include a unique identifier that identifies the responding member of the audience, e.g., by cellphone number, by a username or unique login credential (such as an email address), by a MAC (media access control) address, and so forth, as well as the geographical location, e.g., using GPS, using iBeacon, and the like, of the mobile communication device and, hence, its owner. Although the embodiment of the invention has been described assuming that a single polling of the audience takes place, this is for illustrative purposes only. In some implementations, real-time audience polling may be conducted continuously, periodically (e.g., every five minutes), or on demand. In some variations, the received data may be time-stamped.

More particularly, polling the audience (STEP 4A) and identifying the location of each member the audience (STEP 4C) enables the system, using an applicable template and/or data pulled from the data storage device(s), to identify members of the class (STEP 5A), identify non-members of the class (STEP 5B), and, optionally, identify members of the audience who are unaccounted for (STEP 5C). In some variations, members of the audience who cannot be accounted for during the polling (STEP 5C) may be identified as and included among members of the class (STEP 5A). For example, if a particular template for a discrete emergency event defines class members as only those students, teachers, administrative personnel, and the like who are located within the walls of the school building, once the system polls the audience (STEP 4A), receives and processes the responses (STEP 4B), and ascertains the geographical location of each member of the responding audience (STEP 4C), those members of the polled audience who are located within the walls of the school building at the specified time may be included as members of the class (STEP 5A), while those members of the responding polled audience who are physically located outside of and/or away from the school building at the specified time may be included as non-members of the class (STEP 5B).

In one variation, unpolled members of the audience and/or non-responding members of the audience may be treated as a separated category (STEP 5C), whose membership status must be further determined. Alternatively, unpolled members and/or non-responding members of the audience may be included as members of the class (STEP 5A) until further data may be received that sufficiently establishes that the unpolled members and/or non-responding members of the audience are not members of the class. Possible reasons for members to be unpolled or non-responsive may include, for purposes of illustration and not limitation, may be split into two categories. The first being acceptable categories that may include: low battery, out of range, weak signal strength, blocked signal, and so forth. The second being unacceptable categories that may include:

location within the contained area unknown, possibly in danger, in danger, and so forth. If the aforementioned acceptable or unacceptable categories for members to be unpolled or non-responsive are true, then the applicable reason for their status is communicated (STEP 5C).

In some implementations, biometric information of the members of the audience may be used to identify, manually or automatically, polled and unpolled members of the audience, as well as responding and non-responding members of the audience. For example, the processor and/or memory may include a database that includes biometric information about each member of the audience that opts into providing the biometric information. These data may be made available to anyone polled, whether they have responded or not, or their availability may be restricted to a certain class of pre-defined persons, e.g., teachers, admin personnel, and the like. In one embodiment, the biometric information may include a facial image of each audience member, e.g., a recent school picture. Advantageously, an image taken by any responding member may be used, in combination with the stored biometric data, to further identify responding, non-responding, polled, and unpolled members that appear in the image. This feature serves to further verify the presence and physical location of members of the audience, as well as to identify individuals who are unaccounted for. Other biometric data used may include fingerprints, palm prints, eye scans, and the like.

Once responses to the polling have been received (STEP 4B) and once the system has categorized these data into two (STEPS 5A and 5B) or three categories (STEPS 5A, 5B, and 5C), these data may be stored, e.g., in a data storage device, (STEP 6) and further manipulated (STEP 7) to provide, in real-time, updates on the members of each group. For example, subject to default or individual privacy preferences, the names of members of the class and their locations with respect to the threat may be shared with one or more third parties. Similarly, again subject to default or individual privacy preferences, the names of non-members of the class, who are deemed not in danger may be shared with one or more third parties. Finally, once again subject to default or individual privacy preferences, the names of unaccounted for members of the audience, whose status is unknown, may be shared with one or more third parties. In one variation, the names of unaccounted for members of the audience, may be used to locate and account for the individual, should those individuals be unpolled or non-responsive for an unacceptable category.

Advantageously, communication of data, especially video image data and sound or verbal data, between mobile communication devices and the system may continue during the emergency event. Moreover, data transmitted may also be time-stamped as to the time of occurrence rather than the time of transmission, which, for whatever reason, may not coincide. For example, a member(s) of the group may be able to capture a "selfie" or a video clip showing the condition of the member and/or the situation. These video image data may then be uploaded and transmitted to the system for interpretation and action.

It is understood that the various features, elements, methods or processes of the foregoing figures and descriptions are interchangeable or combinable to realize the implementations described herein. Aspects of the application can be practiced by other than the described implementations, which are presented for purposes of illustration rather than limitation, and the aspects are limited only by the claims which follow.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

A further feature of the present invention includes augmented reality technology that operates to apply indicia, one or more overlays, or the like to an image(s). More particularly, in some applications, augmented reality technology enables users to selectively modify a captured image, e.g., by including an indicia (e.g., a green arrow or a red letter X), one or more overlays (e.g., a dashed line), or the like to the image, and re-broadcasting the image to members of the audience and/or the class for their use. For example, after the processor has received an image from a member of the audience, a user, using available software, may modify the image to include a red letter X as a place or direction to avoid and/or a green arrow as a directional indication of a safe direction to go. The modified image can be uploaded and broadcast to everyone in the audience or a specific member(s) in the audience. Although this description refers to individual captured images, augmented reality technology, using the same or similar indicia, overlays, or the like, may also be applied to live, real-time video feeds to show escape routes, unsafe areas and places to avoid, generally safe areas, etc.

In some embodiments, the system and method may further include software, an algorithm, a driver program, or the like that provides a dashboard and touch-sensitive screen or other graphical user interface (GUI), for use at, for example, a district or other station that is one or more reporting levels higher than that of the emergency event. In some applications, the embodied dashboard is structured and arranged to provide a centralized Web administration dashboard that provides a bird's eye view of the emergency event for the purposes of oversight and indirect intervention while also enabling a, for example, district administrator to oversee the event while also exercise command and control over the issuance and transmission of messages to any of a plurality of audiences, e.g., parents, first responders, hospitals, the press, the public in general, and the like.

Figure 4:
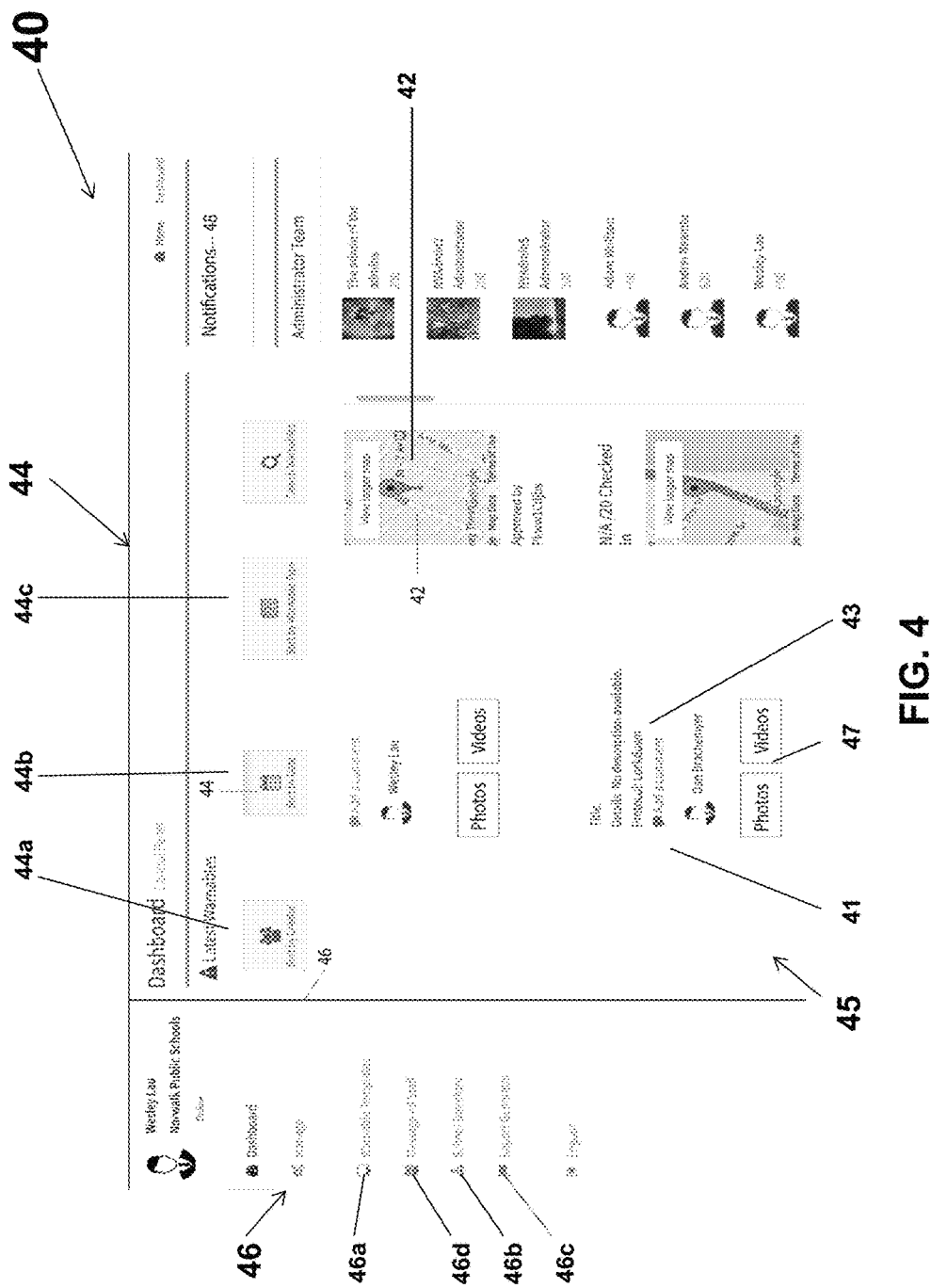
FIG. 4 shows an illustrative dashboard in accordance with one or more embodiments of the present invention.

An illustrative embodiment of a dashboard 40 is shown in FIG. 4. In some embodiments, the dashboard 40 may be tailor-made to provide features most desired by the user, e.g., the district administrator. Representative interactive features on the dashboard 40 may include a situation map 42, a series of filters 44, a data menu 46, and a notification board 48. For example, the situation map 42 may provide an at-a-glance record of the geographic location of the on-going emergency event(s) that are within the purview of the user. The scale of the situation map 42 may be increased or decreased using, respectively, a zoom-out or a zoom-in interactive device and may be moved up and down, to the left or right, and so forth. This feature enables the user to selectively zoom-in on an emergency event occurring at a specific geographic location so that the user is able to see at-a-glance the geographical location of the event, the neighborhood surrounding the event, the road network about the location of the event, the proximity of first responders and medical care providers to the location of the event, and so forth. Advantageously, once the user receives notification of an emergency event originating at a location for which the user is responsible, an icon identifying the location and the nature of the emergency event may appear automatically on the situation map 42 or, alternatively, may be manually placed on the situation map 42. Moreover, the number of incoming and/or active alert messages may be shown using an icon. For example, icons may represent that the user has received a number of fire alarm messages, as well as a number of lockdown messages. In some implementations, the software, algorithm, driver program, and the like may produce a flashing icon on the situation map 42 to indicate that a new alarm message is being transmitted and received.

In some implementations, the dashboard 40 may include a series of filters 44 that, when clicked on, e.g., using a touch-screen, mouse icon feature, or the like, enable the user to focus in on desired data of immediate interest. For example, one such filter may enable the user to sort the incoming data by school 44a, by a time window 44b corresponding to when the data were received, by the nature or category of the emergency event 44c, and so forth. Because all incoming data may be categorized, catalogued, and stored in one or more databases provided for a plurality of the categorizations of the data, filtering facilitates extracting the data from an appropriate database.

A data menu 46 having a plurality of buttons or links to a variety of functions may also be provided. The dashboard data menu 46 may include, for example, a link to a database containing emergency event templates 46a, a link to a school directory database 46b, a link to report generator database 46c, a link to database of prepared release messages 46d, and the like. As previously described, advantageously, having a plurality of prepared-in-advance templates of actions to take, as well as not to take, in the event of a specific emergency event, facilitates and expedites decision making at all levels of the response. At the district administrator user level, the templates for each school may be stored in a database, e.g., a cloud-based storage to which both the school and the district administrator have wired or wireless access. By clicking on the link 46a, those data may be called by the user.

The school directory database link 46b provides access to a database, e.g., a cloud-based storage to which both the school and the district administrator have wired or wireless access, containing personnel and other information pertaining to each school within the school district. As previously described, this information may include information about the staff and faculty, as well as about the student body, which can include biometric information. The data available to the district administrator user may include an indication whether or not the individual has been checked-in, remains at-risk, has not been accounted for, and so forth.

A menu 46 link to a report generator database 46c provides access to respective databases, e.g., a cloud-based storage to which both the school and the district administrator have wired or wireless access, from which the user, at either the school or the district administrator level, may be able to generate analytics for future use in managing emergency events. For example, the analytics generated may detail the number and frequency of occurrence of emergency events, the locations and causes of the emergency events, the time required to take first action, the time to resolve the emergency event, and the like.

The menu 46 link to a database of prepared release messages 46d provides access to respective databases, e.g., a cloud-based storage to which both the school and the district administrator have wired or wireless access, containing prepared-in-advance reports and messages that can be cut-and-pasted to outgoing transmissions, e.g., updates, press releases, and the like, to third parties.

In another implementation, yet another feature on the dashboard 40 may include a notification board 48. The notification board 48 may provide, for example, a running historical record of every active emergency event reported in the district, providing a most recent record at the top of a, e.g., scrollable, list. When a new record is received, the new record replaces the previously most recent record, which may move down one position in the list of historical records.

Other exemplary features that may be generated and supported on a district administration dashboard 40 may include an emergency event summary section 45 that, in some applications, includes real-time message traffic associated with the emergency event. Advantageously, the dashboard 40 may be configured to include all or some portion of the active emergency events that have been reported to the district administrator user. For example, in the exemplary summary section 45 of FIG. 4, in addition to header information identifying the location, e.g., school, and some basic details of the emergency event, e.g., "kitchen fire," an optional emergency event icon 41 may be generated and displayed, indicating the nature of the emergency event, e.g., an intruder alert at School 200. The summary section 45 may also include a chat room feature 43, which may be made public or kept private, that receives, records, and displays, in real-time, communications between the district administrator user and one or more authorized persons at the school, e.g., the superintendent, the principal, and so forth, Some portion 47 of the summary section 45 may also be configured to display images or videos of aspects of the emergency event that have been received and stored at the school and/or district administrator level. Advantageously, the image/video portion 47 may be interactive to enable a user, for example, to click on an image, e.g., using touch-screen, a mouse icon, and the like, to enlarge it; to click on a video, e.g., using touch-screen, a mouse icon, and the like, to play or run the video. Additional summary section 45 features may enable a user to click on the image or video, e.g., using touch-screen, a mouse icon, and the like, to open a database of other images or other videos associated with and received in connection with the corresponding emergency event. Additional data as to the source of the image or video, the capture time of the image or video, the transmission/receipt time of the image or video, the approximate azimuth or direction from which the image was taken, and the like, as well as data identifying persons, features, buildings, and the like shown in the image or video, may also be stored to be accessible along with the corresponding image or video.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. An emergency alert system for use with a plurality of individuals in a pre-definable are, each individual having a mobile communication device and each mobile communication device in communication with a communication network, the system comprising:

a non-transitory, machine-readable medium storing information that includes machine-readable processor-executable instruction;
at least one data processor that executes the instructions stored in the non-transitory, machine-readable medium that enable each data processor to:
account for each individual within the pre-definable area during a period of time;
identify any individual not within the pre-definable area during the period of time; and
aggregate and compile individual location data; and
a plurality of customized templates, each template usable by the system for generating and transmitting at least one communication alert signal and for aggregating and managing any communication responses received from some portion of the plurality of individuals, the templates adapted to enable each data processor to:
generate and transmit the at least one communication alert to the plurality of individuals;
receive response signals to the at least one communication alert from some portion of the plurality of individuals;
use data contained in the response signals to identify each responding individual;
use data contained in the response signals to identify a geographic location of each responding individual;
compare the geographic location of each responding individual to the pre-defined area; and
for any comparison in which the geographic location of a corresponding individual is located within the pre-defined area, store the identity and geographic location of the corresponding individual in a first database, otherwise
for any comparison in which the geographic location of a corresponding individual is not located within the pre-defined area, store the identity and geographic location of the corresponding individual in a second database.

2. The system of claim 1, wherein the pro-definable area comprises at least one of a geographic area, a contained structure, and a geo-fence area.

3. The system of claim 1, wherein the plurality of individuals is selected from a group consisting of residents, tenants, inmates, passengers, students, teachers, employees, public officials, service members, hospitality guests, and event spectators.

4. The system of claim 1, wherein accounting for each individual further comprises determining a geographical location of the individual during the period of time.

5. The system of claim 4, wherein accounting for each individual comprises comparing where each individual is located during the period of time with where each individual is supposed to be located during the period of time.

6. The system of claim 5 wherein accounting for each individual further comprises time-stamping each individual's location.

7. The system of claim 1, wherein identifying any individual not within the pre-definable area comprises determining a geographical location of the individual during the period of time.

8. The system of claim 1, wherein accounting for each individual and identifying any individual comprises determining a first class of individuals located within a geo-fence area and a second class of individuals located outside of the geo-fence area.

9. The system of claim 1 further comprising notifying each identified individual within the pre-definable are of an existing condition.

10. The system of claim 1 further comprising identifying at least one reason why any individual is not within the pre-definable area during the period of time.

11. The system of claim 1, wherein for any comparison in which the geographic location of a corresponding individual is not located within the pre-defined are, the system further comprising identifying at least one reason for why any individual is not within the pre-definable area during the period of time.

12. The method of claim 1, wherein the communication alert generated comprises pie-determined variables that allow a responding individual to at least one of share the geographic location of the responding individual, include at least one of images and video relating to an alert, and view a set of response protocols that each individual receiving the alert.

13. A method of alerting a plurality of individuals in a pie-definable area of an existing condition, each individual having a mobile communication device and each mobile communication device in communication with a communication network, the method comprising:
providing a non-transitory, machine-readable medium storing information that includes machine-readable, processor-executable instructions, at least one data processor that executes the instructions stored in the non-transitory, and a plurality of customized templates, each template usable by the data processor for generating and transmitting at least one communication alert signal and for aggregating and managing any communication responses received from some portion of the plurality of individuals;
accounting for, by the at least one data processor, each individual within the pre-definable area during a period of time;
identifying, by the at least one data processor, any individual not within the pie-definable area during the period of time; and
aggregating and compiling, by the at least one data processor, individual location data, wherein the templates enable each data processor in:
generating and transmitting the at least one communication alert to the plurality of individuals;
receiving response signals to the at least one communication alert from some portion of the plurality of individuals;
sing data contained in the response signals to identify each responding individual;
using data contained in the response signals to identity a geographic location of each responding individual;
comparing the geographic location of each responding individual to the pre-defined area; and
for any comparison in which the geographic location of a corresponding individual is located within the pre-defined area, storing the identity and geographic location of the corresponding individual in a first database, otherwise
for any comparison in which the geographic location of a corresponding individual is not located within the pre-defined area, storing the identity and geographic location of the corresponding individual in a second database.

14. The method of claim 13, wherein the pre-definable area comprises at least one of a geographic ara, a contained structure, and a p-fence ara.

15. The method of claim 13, wherein the plurality of individuals is selected from a group consisting of residents, tenants, inmates, passengers, students, teachers, employees, public officials, service members, hospitality guests, and event spectators.

16. The method of claim 13, wherein accounting for each individual further comprises determining a geographical location of the individual during the period of time.

17. The method of claim 16, wherein accounting for each individual comprises comparing where each individual is located during the period of time with where each individual is supposed to be located during the period of time.

18. The method of claim 17 wherein accounting for each individual further comprises time-stamping each individual's location.

19. The method of claim 13 further comprising identifying at least one reason why any individual is not within the pre-definable area during the period of time.

20. The method of claim 13, wherein identifying any individual not within the pre-definable area comprises determining a geographical location of the individual during the period of time.

21. The method of claim 13, wherein accounting for each individual and identifying any individual comprises determining a first class of individuals located within a geo-fence area and a second class of individuals located outside of the geo-fence area.

22. The method of claim 13 further comprising notifying each identified individual within the pre-definable area of an existing condition.

23. The method of claim 13 further comprising activating an emergency alarm feature to initiate the method.

* * * * *